N. GRAY, Jr.
BAGGAGE CARRIER FOR AUTOMOBILES.
APPLICATION FILED NOV. 6, 1915.
1,179,090.
Patented Apr. 11, 1916.
4 SHEETS—SHEET 2.
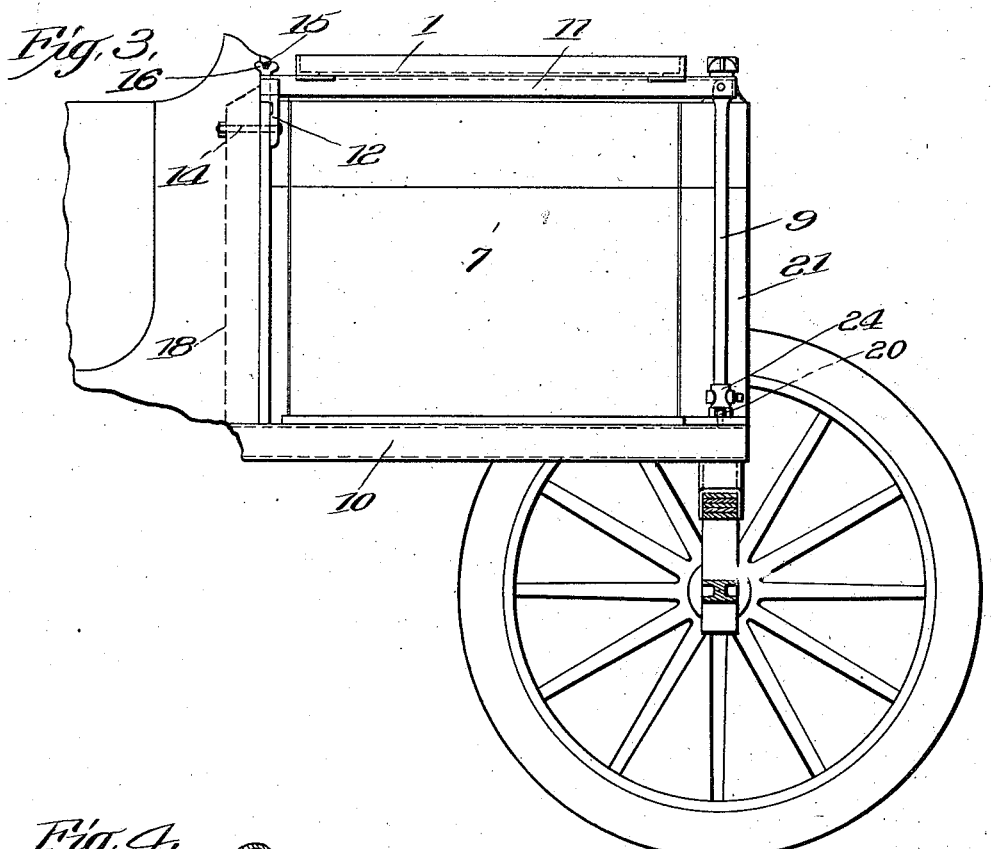
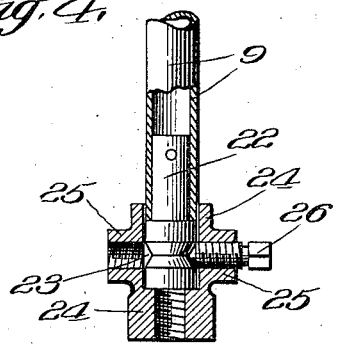
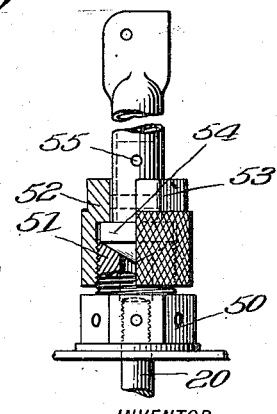
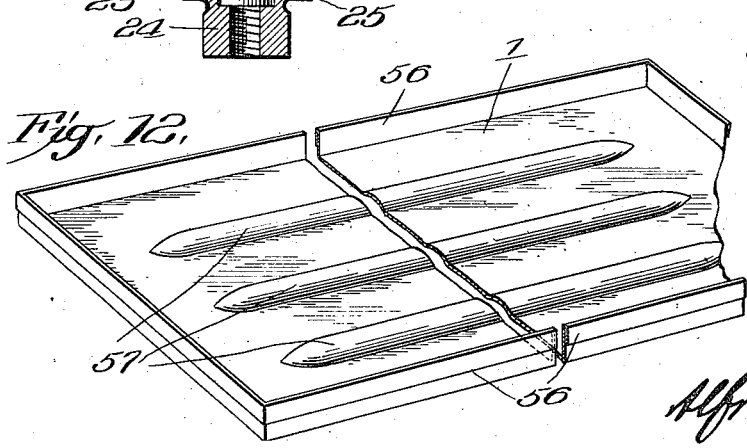
INVENTOR
Niel Gray Jr.
BY
Alfred Wilkinson
ATTORNEY

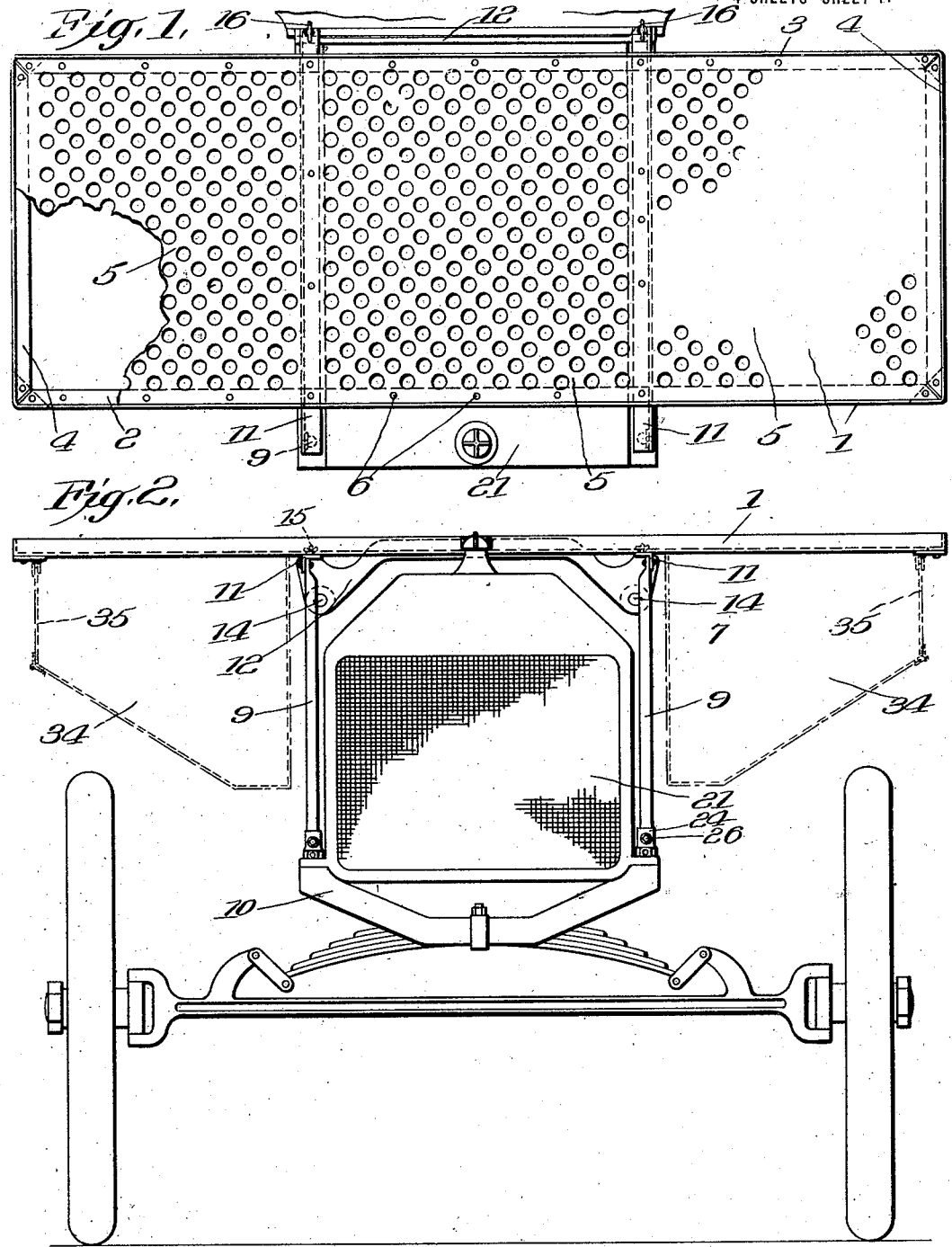

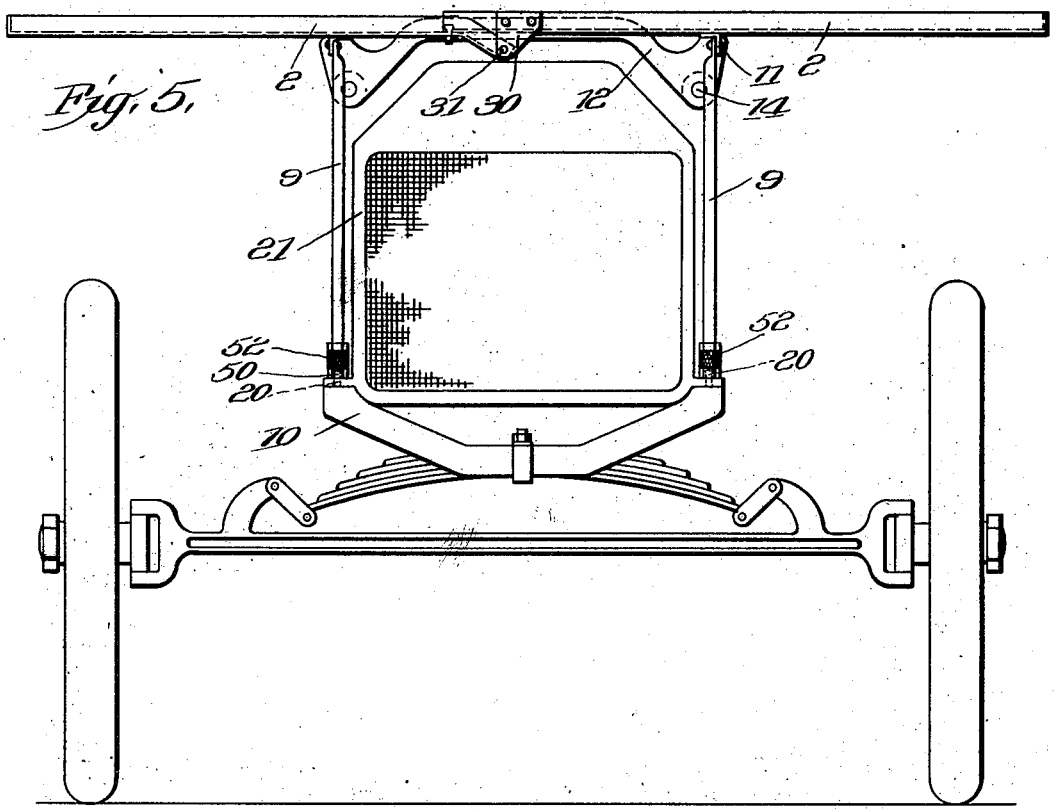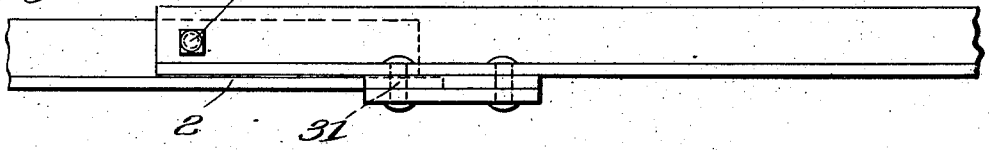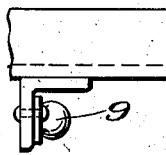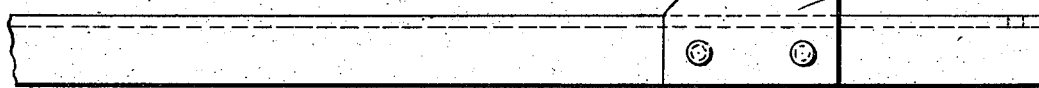

N. GRAY, Jr.
BAGGAGE CARRIER FOR AUTOMOBILES.
APPLICATION FILED NOV. 6, 1915.
1,179,090.
Patented Apr. 11, 1916.
4 SHEETS—SHEET 4.
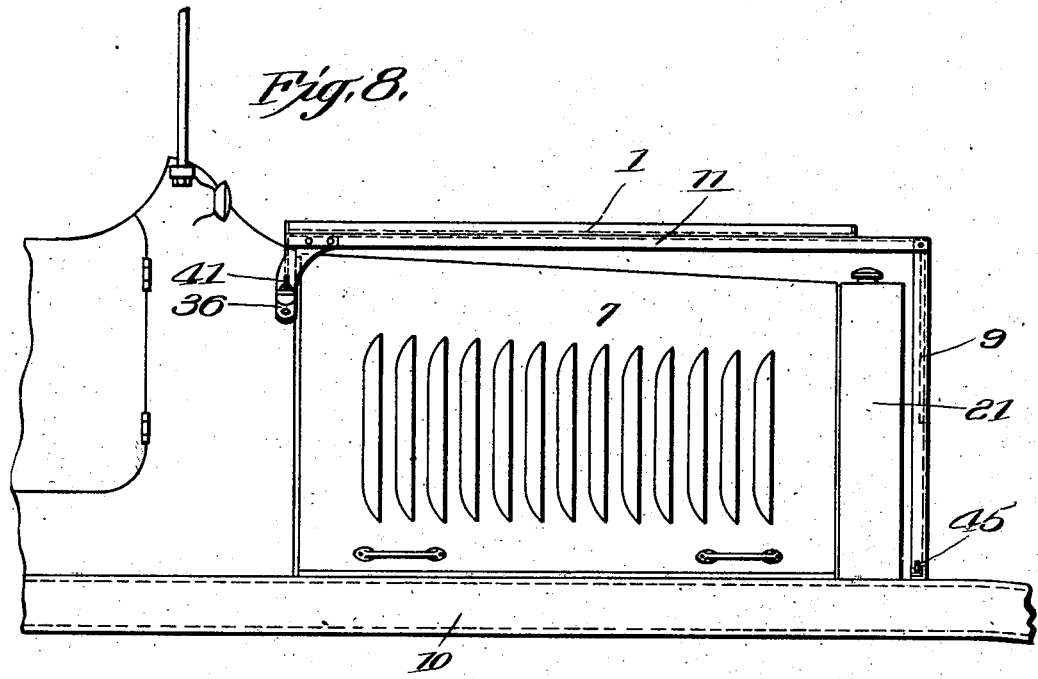
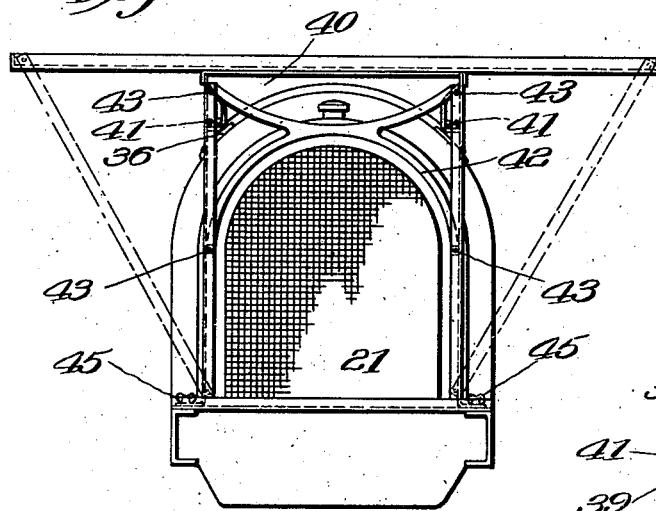
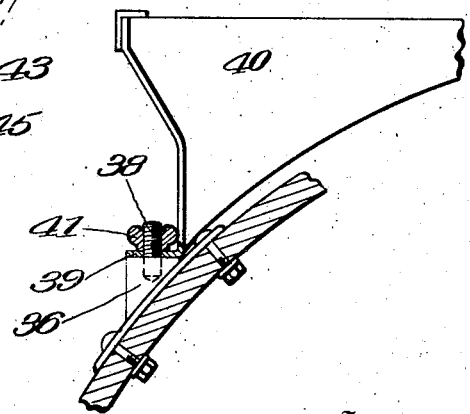
Inventor
Niel Gray Jr.
By his Attorney
Alfred Wilkinson

UNITED STATES PATENT OFFICE.

NIEL GRAY, JR., OF OSWEGO, NEW YORK.

BAGGAGE-CARRIER FOR AUTOMOBILES.

1,179,090. Specification of Letters Patent. Patented Apr. 11, 1916.

Application filed November 6, 1915. Serial No. 59,902.

*To all whom it may concern:*

Be it known that I, NIEL GRAY, Jr., a citizen of the United States, residing at Oswego, in the county of Oswego and State of New York, have invented new and useful Improvements in Baggage-Carriers for Automobiles, of which the following is a specification.

This invention relates to an improved baggage carrier or rack designed for automobiles and designed particularly for use with such vehicles of the tourist pleasure type where it is desirable to keep the tonneau of the car clear of incumbrances. Baggage and other articles carried in the tonneau, in the usual way, are liable to become damaged, also to mar and injure the car, are inconvenient, interfering with the comfort of the passenger, and are a source of danger to passengers when getting in and out. To overcome all these objections aforesaid I have devised a special carrier, essentially new in construction and arrangement. It is arranged in a new location, that is in front of the tonneau of the car, and by its peculiar construction is supported above the motor hood in a manner not to interfere with the raising of the hood for gaining access to the motor.

The use of my improved construction of rack is accompanied by many important advantages including carrying of the parcels in a forward location where there is the least accumulation of dirt and dust and where they are constantly in sight and convenient of access.

A particular advantage in a desirable form here shown lies in its being detachably secured to the car without additional securing bolts, for this is accomplished by employing the bolts present on the machine to perform the additional function of securing the rack in position.

My invention, embodying said suggested features and other peculiar advantages, is fully shown in the drawing wherein the reference numerals of this description are applied to the corresponding parts in the different views.

Of the figures, Figure 1 is a partial plan view of my invention applied to a standard make of automobile. Fig. 2 is a front elevation thereof. Fig. 3 is a view in side elevation. Fig. 4 is a detail sectional view illustrating the special coupling of my invention. Fig. 5 is a view similar to Fig. 2 illustrating a modified form of the carrier of my invention. Fig. 6 is a detail plan view thereof. Fig. 7 is a detail front elevation of the same in folded position. Fig. 8 shows a desirable modified form of my invention applied to a different make of car. Fig. 9 is a front elevation thereof. Fig. 10 is a detail sectional view of the attaching parts. Fig. 11 is a modified form of coupling for the supporting posts and Fig. 12 is a perspective view of a desirable modified form of carrier top or platform.

In the drawings I have shown an approved form of my invention comprising a baggage rack or platform support 1 formed of front and rear frame members 2—3 and the side members 4—4. As shown these frame members are of angle-iron suitably joined to form a rectangular rack-frame to which is fitted the perforated bottom plates 5 secured by suitable bolts 6—6. Other forms of bars may be substituted for the angles. The rack, so formed, is supported above the usual hood 7 over the motor in a manner to carry the rack clear of the hood so that, with most cars, there is no interference with the raising of the hood to get at the motor. The supporting parts therefor comprise vertical posts 9—9 in front, detachably secured to the chassis frame 10, and, at their upper ends, secured to the horizontal supporting members 11—11, desirably by pivotal means. Said last members extend rearwardly to a suitable point of support on the usual dash or front of the tonneau proper. As here shown a suitable bracket 12 is affixed directly to the dash by means of bolts 14—14 and this bracket is provided with screw studs 15 to receive the rear ends of the supporting members 11, which are clamped in position thereon by the thumb nuts 16—16. The platform, or body of the carrier is secured on the horizontal members 11 11 by bolts, rivets, or other suitable means. A firm connection is necessary to prevent displacement, rattling, etc.

The arrangement described permits the carrier to be readily and conveniently detached when not desired for use and provides for its being supported independently of the hood. For detaching it is merely necessary to remove the two thumb nuts 16 and disconnect the supporting posts 9—9 from the chassis frame and for this latter purpose special provision is made in the form of an improved coupling device to facilitate their attachment and removal. This valuable feature of my invention consists in utilizing the standard parts or securing means of the car to perform the additional function of securing the carrier supports. To this end, in the arrangement of Figs. 1, 2 and 3 wherein there is illustrated a well known car of standard manufacture, it is designed that slightly longer securing bolts 14, as shown, shall be substituted for the usual bolts for securing the inner dash 18 whereby the bolts 14 perform the double function of securing the dash and the bracket 12, and the latter is thus attached to the car without additional securing parts or additional drillings through the dash. Similarly, it is arranged that the attaching parts for the supporting front posts 9 shall be fitted to standard parts on the car and they are here shown attached to the usual screw studs 20 provided for securing the radiator 21 in place on the chassis.

An improved form of coupling for attaching the posts 9 to the chassis is shown in Fig. 4 and consists in affixing to the lower ends of the posts, which are of tubular form, suitable plugs 22 formed with annular grooves 23. For the usual radiator clamping nuts are substituted special nuts 24 threaded to fit the studs 20 and provided each with a socket to receive the lower end of the post and the plug 22. The nut 24 is provided with threaded bosses 25—25, one or more, adapted to receive suitable set-screws 26 to engage with the groove 23. Thus by tightening the set-screws the posts are securely locked in position and upon loosening the set-screws the posts are easily detached, the nuts being left in position. The fact that there are a plurality of bosses 25 insures convenient accessibility at all times when attaching the posts to the studs. Thus this construction of carrier can be installed or detached quickly and easily. When in place it is not conspicuous, and, when removed the car is practically of normal appearance for the special brackets are hardly noticeable.

As it may be desired at times to carry the carrier when detached, or to store it in small space, I have devised a desirable modified form, illustrated in Figs. 5, 6 and 7. As there shown, the frame members 2—3 of the rack are each made in two parts, hinged together at the center, thereby permitting the carrier or platform to be folded into a compact bundle which may be secured to the rear of the car or packed away, when not in use. As indicated, the sections of the members 2 at one side are provided with hinge plates 30 bolted thereon and to these plates the opposite sections are hinged by pins 31. When the carrier is unfolded and extended for use, one of the horizontal flanges of the angular section 2 will overlie the flange of the opposite section as shown in Fig. 6, and the two are then desirably rigidly secured by a suitable bolt and nut 32. Upon removing the nut 32 the carrier top, or platform, may be folded upon itself as shown in Fig. 7, and the posts 9, being pivoted to the members 11, may likewise be folded to lie flat between the sections of the rack.

As shown in Fig. 2 carrier baskets or receptacles 34 may conveniently be associated with my carrier to afford additional carrying capacity when desired. These baskets may be of any suitable form and may desirably be removably secured to the rack frame members beneath the bottom plate 5 and provided with side openings and doors 35 for the openings hinged to the body of the basket.

While the construction in so far as described provides for attaching my rack fixtures of a standard construction it will be understood that the embodiment of my invention will vary in accordance with the particular car with which it is to be used and may be much modified without departing from my invention. In some makes of cars the radiator holding studs are not in suitable position and in such case the posts 9 may be secured to lamp bracket studs or to studs specially provided.

I show in Figs. 8, 9 and 10 a suitably modified construction of carrier supporting parts adapted for use with another well known make of automobile. In this modification the supporting posts 9 are secured to forward holding studs as heretofore described but a different arrangement is provided for supporting the rear of the carrier. As best shown in Fig. 10 in place of the bolts 14, I have here provided stud-brackets 36—36 bolted on the opposite sides of the front or dash portion of the tonneau. These brackets 36—36 are formed with integral screw-studs 38—38 to which are fitted the flanges 39 of a rear cross-member 40 of the carrier frame 1. Thumb screws 41 are threaded to the studs whereby the cross-member 40 and the carrier-frame are clamped in position. As before, upon removing the two thumb screws 41 at the rear and also the oppositely arranged thumb-screws 45 at the front the carrier is quickly and easily removed. An additional cross-brace 42 is here shown to brace the front posts 9—9 and connected thereto at points 43. Also inclined braces 48 may be provided arranged as indicated in dotted lines in Fig. 9 to give additional support to the ends of the rack frame.

In Fig. 11 I have illustrated a suitable modified construction of detachable coupling for the supporting rods 9. A special nut 50 is threaded to the holding stud 20 and is provided with an externally threaded extension 51. To the extension is threaded a clamping nut 52 suitably knurled and squared at 53 for convenience in adjusting. To the lower end of the post 9 there is fitted a headed plug 54 held by a pin 55, the enlarged head portion thereof being received within the socket of the nut 52 and thereby secured onto the nut 50. As shown the extension 51 of nut 50 is provided with a conical recess to receive the conical lower surface of the plug 54 which when clamped down forms a particularly rigid connection. Upon unscrewing of the nut 52 the posts 9 are disconnected to permit removal of the carrier.

In Fig. 12 I show an approved modified form of rack construction. As here shown the rack is made in one piece and of sheet metal with side flanges 56 which are bent upwardly and turned over to give a smooth upper edge as shown. Reinforcing ribs 57 are pressed up in the bottom of the pan which will reinforce the pan, prevent rumbling and will space the baggage from the pan bottom as will readily be understood. The turned over flanges 56 may be strengthened by being turned over to inclose a wire in a manner well understood.

I have thus provided a baggage carrier for automobiles which is light, simple, convenient, easily manipulated, of maximum capacity and carrying the baggage in front under the eye of the driver. My carrier may be easily adapted to various other types of cars and to various special purposes and may be much modified without departing from the scope of my invention.

Having described my invention I claim,

1. A baggage carrier for automobiles comprising a rack and means adapted for supporting the rack in position above the motor hood, said means comprising rigid supports forwardly arranged and supporting means for the rear end of the rack, said front and rear supports being arranged to carry the rack spaced free and clear of the hood substantially as described.

2. A baggage carrier for automobiles comprising a carrier-member or rack, means adapted for supporting the rack in a position above the motor hood said means comprising a bracket secured to the dash portion of the tonneau and supporting posts forwardly arranged and supported on the chassis-frame, means for detachably securing the carrier member to the bracket and means for detachably securing the posts to the chassis frame substantially as described.

3. A baggage carrier for automobiles consisting of a rack, means adapted for supporting the rack in a position above the motor hood and clear thereof, said means comprising a bracket secured to the dash portion of the tonneau, forwardly arranged supporting posts pivotally connected to the rack, means for detachably securing the rack to the bracket and means for detachably securing the posts to the chassis frame substantially as described.

4. A baggage carrier for automobiles comprising a carrier member and means adapted for supporting the carrier member above the motor hood and clear thereof, said means consisting of a bracket secured to the dash portion of the tonneau by standard fixtures thereon and supporting posts forwardly arranged and supported on the chassis frame, means for detachably securing the carrier member to the bracket and means for detachably securing the posts to the chassis frame substantially as described.

5. A baggage carrier for automobiles comprising a carrier member and means adapted for supporting the carrier member above the motor hood consisting of a bracket secured to the dash portion of the tonneau and supporting posts forwardly arranged and pivotally connected to the carrier member, means for detachably securing the carrier member to the bracket and means for detachably securing the posts to standard fixtures on the chassis frame substantially as described.

6. A baggage carrier for automobiles comprising a carrier member and means adapted for supporting the carrier member above the motor hood and clear thereof, said means consisting of a bracket adapted to be secured to the dash portion of the tonneau by standard fixtures thereon and supporting posts pivotally connected to the carrier member at the front thereof, means for detachably securing the carrier member to the bracket and means for detachably securing the posts by standard fixtures to the chassis frame substantially as described.

7. A baggage carrier for pleasure automobiles comprising a carrier member or rack, means adapted for supporting the rack in a forward position above the motor hood, said means consisting of a bracket adapted to be affixed to the dash portion of the tonneau by oppositely positioned dash securing bolts, threaded studs on the bracket to be received in apertures in the carrier member, clamping screws on the studs and opposite supporting posts forwardly arranged and pivotally connected to the carrier member and means for detachably securing the posts to fixtures on the chassis frame substantially as described.

8. A baggage carrier for pleasure automobiles comprising a carrier member or rack, means adapted for supporting the rack in a forward position above the motor hood, said means consisting of a bracket adapted to be affixed to the dash portion of the tonneau by oppositely positioned dash securing bolts, threaded studs on the bracket to be received in apertures in the carrier member, clamping screws on the studs and opposite supporting posts forwardly arranged and pivotally connected to the carrier member and means for detachably securing the posts to threaded studs on the chassis frame comprising coupling nut elements threaded to said studs and means operative to engage the nuts to couple the posts thereto substantially as described.

9. A baggage carrier for automobiles comprising a carrier member, means adapted for supporting the carrier member in a position above the motor hood consisting of a bracket secured to the dash portion of the tonneau and supporting posts forwardly arranged and supported on the chassis frame, means for detachably securing the carrier member to the bracket and means for detachably securing the posts to threaded studs in the chassis frame, said last means consisting of nut elements threaded to said studs, shouldered plugs secured to the supporting posts and engaging members threaded to the nut elements to couple the studs thereto by engagement with the shoulders thereof substantially as described.

10. A baggage carrier for automobiles comprising a carrier rack and means adapted for supporting the rack in a position above the motor hood, said means comprising means for detachably securing the rack to the dash portion of the tonneau and oppositely arranged supporting posts forwardly positioned and supported on the chassis frame and means for detachably securing the posts to the chassis frame substantially as described.

11. A baggage carrier for automobiles comprising a carrier rack member and means for detachably supporting it above the motor hood consisting of means detachably to secure the rack to the dash portion of the tonneau, forwardly positioned supporting posts connected to the rack and means for detachably securing the posts to the chassis frame, said rack having frame members pivotally connected to permit of the rack being folded up when not in use, substantially as described.

12. A baggage carrier for automobiles comprising a carrier rack member and means for detachably supporting it above the motor hood consisting of means detachably to secure the rack to the dash portion of the tonneau, forwardly positioned supporting posts pivotally connected to the rack and means for detachably securing the posts to the chassis frame, said rack having its frame members articulated to permit of the rack being folded when not in use and provided with means for rigidly securing it in opened position substantially as described.

13. A baggage carrier for automobiles comprising a carrier rack member and means for detachably supporting it above the motor hood consisting of means detachably to secure the rack to the dash portion of the tonneau, forwardly positioned supporting posts connected to the rack and means for detachably securing the posts to the chassis frame and receptacles supported by the rack at each side of the hood substantially as described.

14. A baggage carrier for automobiles comprising a rack and means adapted for supporting the rack in a position above the motor hood, said means comprising rigid supports forwardly arranged and supported on the chassis, supporting means for the rear end of the rack, said front and rear supports being arranged to carry the rack spaced clear of the hood and detachable securing means for securing the carrier in position substantially as described.

15. A baggage carrier for automobiles comprising a rack and means adapted for supporting the rack in a position with relation to the motor hood said means comprising rigid supporting posts forwardly arranged to each side of the hood and supported on the chassis, supporting means for the rear end of the rack, said front and rear supports being arranged to carry the rack spaced clear of the hood and detachable securing means for securing the carrier in position substantially as described.

In testimony whereof I have signed my name to this specification.

NIEL GRAY, JR.